United States Patent
Sexton et al.

(10) Patent No.: US 10,261,838 B2
(45) Date of Patent: Apr. 16, 2019

(54) METHOD AND DEVICE FOR ALLOCATING RESOURCES IN A SYSTEM

(71) Applicant: General Electric Company, Schenectady, NY (US)

(72) Inventors: Daniel White Sexton, Niskayuna, NY (US); Austars Raymond Schnore, Jr., Scotia, NY (US); William David Smith, II, Schenectady, NY (US); Wesley Michael Skeffington, Clifton Park, NY (US); Joel Frederick Markham, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 114 days.

(21) Appl. No.: 15/234,569

(22) Filed: Aug. 11, 2016

(65) Prior Publication Data
US 2018/0046515 A1 Feb. 15, 2018

(51) Int. Cl.
G06F 9/46 (2006.01)
G06F 9/50 (2006.01)
G06F 21/62 (2013.01)

(52) U.S. Cl.
CPC .......... G06F 9/5061 (2013.01); G06F 9/5005 (2013.01); G06F 21/6218 (2013.01)

(58) Field of Classification Search
None
See application file for complete search history.

(56) References Cited

U.S. PATENT DOCUMENTS

| | | | |
|---|---|---|---|
| 7,289,453 B2 | 10/2007 | Riedel et al. | |
| 7,669,177 B2 | 2/2010 | Gerber et al. | |
| 7,865,582 B2 * | 1/2011 | Santos ................. | G06F 9/5005 709/201 |

(Continued)

FOREIGN PATENT DOCUMENTS

EP 2 631 800 A2 8/2013

OTHER PUBLICATIONS

Chatterjee, Sandeep "Composable system resources as an architecture for networked systems", Massachsetts Instititute of Technology, Deparatment of Electrical Engineering and Computer Science, 2001, 171 pp.

(Continued)

*Primary Examiner* — Gregory A Kessler
(74) *Attorney, Agent, or Firm* — GE Global Patent Operation; Nitin Joshi

(57) ABSTRACT

Provided are a device and method for allocating system resources. In one example, the method includes identifying resources that are available from a plurality of devices included in a system, allocating available resources of the plurality of devices to a plurality of components operating in the system, the allocating comprising reserving a set of resources from the plurality of devices in the system for each respective component, from among the plurality of components, based on operating requirements included in the metadata of the respective component, and managing the system based on the allocated resources. By allocating resources to components executing in the system, in advance, and preventing other components from consuming those resources, the system can operate with improved stability.

21 Claims, 5 Drawing Sheets

(56) References Cited

U.S. PATENT DOCUMENTS

| | | | | |
|---|---|---|---|---|
| 8,843,385 B2* | 9/2014 | Jurca | ................. | G06Q 10/10 |
| | | | | 705/7.11 |
| 9,015,324 B2* | 4/2015 | Jackson | ................ | G06F 9/5027 |
| | | | | 709/201 |
| 9,269,060 B2 | 2/2016 | Maes | | |
| 9,280,335 B2 | 3/2016 | Adi et al. | | |
| 9,286,032 B2 | 3/2016 | Feblowitz et al. | | |
| 9,294,236 B1 | 3/2016 | Ward, Jr. | | |
| 9,354,851 B2 | 5/2016 | Li et al. | | |
| 2002/0007388 A1* | 1/2002 | Bannai | ................ | G06Q 10/06 |
| | | | | 718/104 |
| 2005/0228545 A1* | 10/2005 | Tanaka | ................ | G05B 15/02 |
| | | | | 700/286 |
| 2010/0122253 A1 | 5/2010 | McCart | | |
| 2015/0074278 A1* | 3/2015 | Maes | ................ | H04L 47/70 |
| | | | | 709/226 |
| 2015/0095841 A1 | 4/2015 | Fiedler et al. | | |

OTHER PUBLICATIONS

Morse et al., Proceeding of the 36th conference on Winter Simulation, 2004, pp. 271-278.

Czajkowski, K., et al., "SNAP: A Protocol for Negotiating Service Level Agreements and Coordinating Resource Management in Distributed Systems," Springer verlag, vol. 2537, pp. 153-183 (2002).

Sojka, M., et al., "Modular software architecture for flexible reservation mechanisms on heterogeneous resources," Journal of Systems Architecture, vol. 57, Issue 4, pp. 366-382 (Apr. 2011).

International Search Report and Written Opinion issued in connection with corresponding PCT Application No. PCT/US2017/45366 dated Oct. 25, 2017.

* cited by examiner

FIG. 3

Application Metadata

| Resource | Requirements |
|---|---|
| Security | Encryption, HSM, Location |
| Reliability | RAS, MTBF, Error%, Redundancy |
| Integrity | Accuracy, Consistency |
| Data Volume | Storage, Processing |
| Data Processing | Speed, Processor Type |
| Timeliness | Latency, Jitter |

Device Metadata

| Attribute | Capabilities |
|---|---|
| Security | Encryption, HSM, Location |
| Reliability | RAS, MTBF, Error%, Redundancy |
| Integrity | Accuracy, Consistency |
| Data Volume | Storage, Processing |
| Data Processing | Speed, Processor Type |
| Timeliness | Latency, Jitter |

METHOD AND DEVICE FOR ALLOCATING RESOURCES IN A SYSTEM

BACKGROUND

Control systems are used to manage, command, and regulate the operation and behavior of other devices and/or systems. Control systems may be included in all sorts of fields/facilities such as power plants, aircrafts, trains, manufacturing, industrial processes, electronics, and the like. Legacy control system components (e.g., applications, subsystems, etc.) are traditionally programmed individually and subsequently integrated with the emphasis of solution level architecture and coordination between the components falling on human integrators. These systems typically include a plurality of components running within the system.

During the initial programming phase, the components of a control system do not interact with one another as they are not yet integrated with the rest of the system. However, once integrated into the larger system, interactions occur between the components. Initially, the components may be designed with certain interactions in mind, however, because systems are dynamic there is a possibility of unexpected interactions occurring, for example, interactions which cannot be planned for or which are difficult to foresee. As a result of these interactions, the system may not perform as expected causing the system to become unpredictable. That is, because the control system components are designed and integrated separately, they may not be fully compatible with the other components in a dynamic system. Also, each time a new component is added to the control system the entire system needs to be retested to determine whether the control system operates properly.

BRIEF DESCRIPTION OF THE DRAWINGS

Features and advantages of the example embodiments, and the manner in which the same are accomplished, will become more readily apparent with reference to the following detailed description taken in conjunction with the accompanying drawings, in which:

FIG. 3 is a diagram illustrating an example of metadata including application requirements and system capabilities in accordance with an example embodiment.

Figure 1:
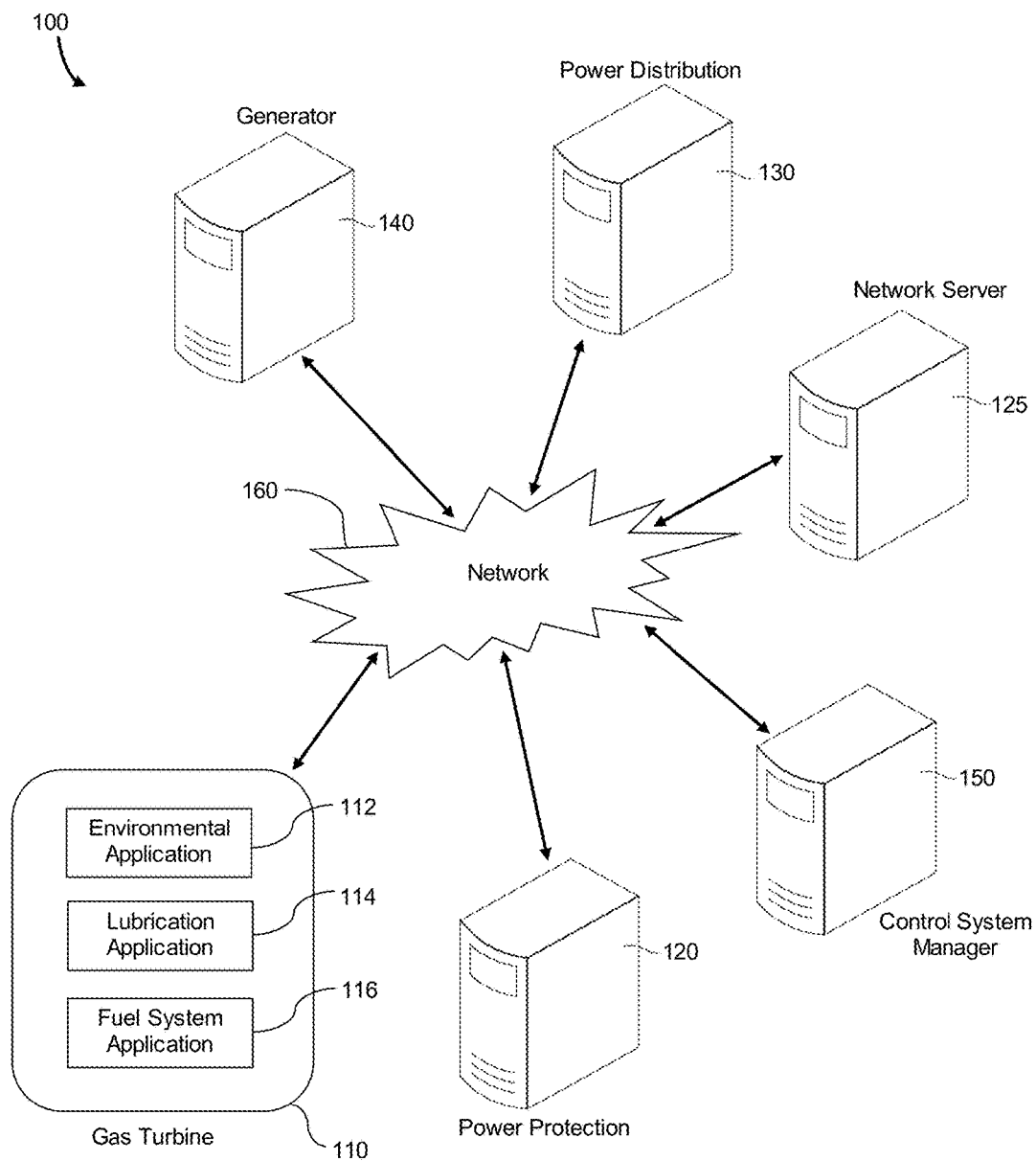
FIG. 1 is a diagram illustrating an example of a power plant system in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The embodiments herein are directed towards a composable control system. The composable system refers to a system of subsystems where each subsystem can operate independently relying on a given allocation of resources. For example, the subsystems may include computers on a network that combined make up an entire system. The allocation of resources may be fixed or it may be budgeted, and it may be determined at run time or design time. Resources for an application running on a subsystem or group of subsystems are guaranteed to the application so that its behavior remains consistent. According to various aspects, the system may collect information from devices in the system and use the information to fully describe aggregated resource capabilities of the devices in the system. For example, the resource requirements for an application may include various attributes of the devices and other resources that make up the system.

Figure 2:
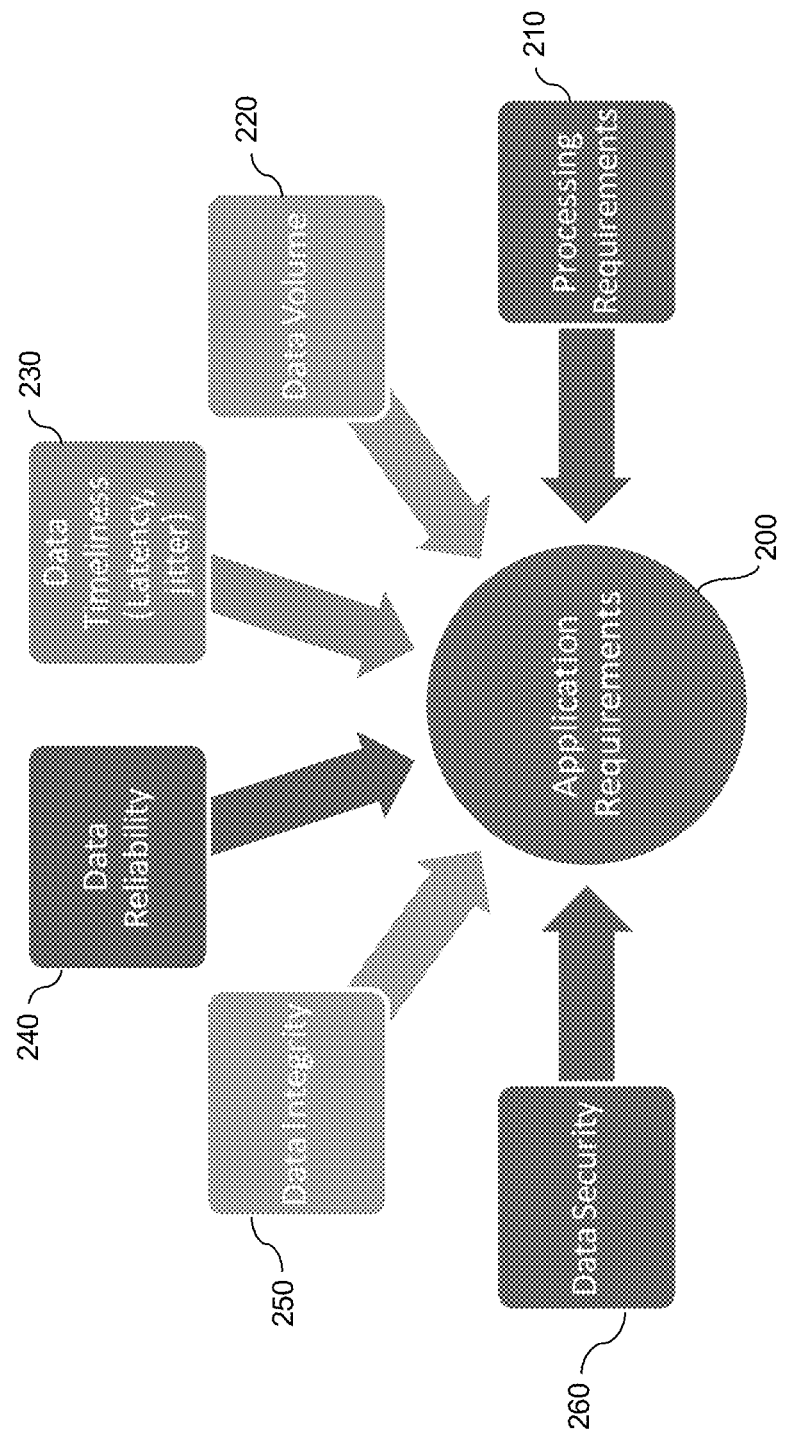
FIG. 2 is a diagram illustrating an example of component resources in accordance with an example embodiment.

As a non-limiting example, the applications may include software, firmware, analytics, and the like, operating on devices (e.g., subsystems) within a system. An example of the resource requirements 200 for an application is shown in FIG. 2. For example, the requirements 200 may include at least one of processing power 210, data volume 220, timeliness 230, data reliability 240, data integrity 250, data security 260, and the like. These requirements 200 may be included in metadata of the respective application. According to various embodiments, a controller device of the system may allocate or guarantee a set of resources to each application, for example, based on the aggregated available resources within the system. Accordingly, the applications may be created and tested in isolation to verify that they work properly, and subsequently added to the system without interrupting the performance of other applications operating there within. In this way, the system becomes composable. In other words, the system may guarantee a set of resources (e.g., security, reliability, integrity, timeliness, processing power, etc.) to a group independent applications which can subsequently be combined to implement the system as a whole.

A system controller may detect an amount of resources or capabilities currently available within the system. For example, the resources/capabilities may include data security attributes, data integrity attributes, data reliability attributes, data timeliness attributes, computational abilities, and the like, of the devices included in the system. The capabilities may be found in metadata of the various devices. According to various aspects, the metadata associated with the devices may be identified by the system controller. The metadata associated with the device capabilities may mirror the metadata associated with application requirements. Using the embedded metadata, the system may automatically configure both hardware, software and security components. Once a system is operating, the same embedded infrastructure can be leveraged to automate the associated life cycle management. In addition, components (e.g., applications) added to the system or predicted to be added to the system may have similar metadata associated therewith that describes its resource requirements. The system manager may detect the requirements needed for a new application, determine whether the system can handle the new application, and automatically allocate a set of available resources to the new application either on request or in advance if the system manager verifies the system's ability to provide those resources.

Legacy control system components are typically integrated and programmed individually. The difficulty of incorporating and coordinating cooperation among the components typically falls on human integrators. However, recently control devices (e.g., sensors, controllers, actuators) are designed with more intelligence, processing power, battery life, and the like. Accordingly, it is possible for the system described herein to automatically configure both hardware (e.g., processing power), software (e.g., integrity, reliability, timeliness), and security features for applications in a composable manner based on these more intelligent the control devices. Once the system is operating, the same embedded infrastructure can be leveraged to automate the associated life cycle management, for example by providing automatic backups and self-recovery through duplication and storage of virtual machine (VM) images.

The system described herein may be a conglomeration of subsystems which share a pool of resources. An application can reside within the system. However, the application can be developed in isolation or with a subset of subsystems and later added to the remaining applications that are included in the total system. The system may detect the capabilities of a system, the attributes of the data and interfaces and the capabilities of the devices and resources that make up the system. Then as each of the subsystems are created and verified in isolation, they perform just as tested when they are assembled in the final system.

When a control application is designed and the execution rate is determined (for example, using classic control theory to determine a Nyquist interval) the computational requirements can be determined. From a functional perspective and an understanding of the system goals, criticality of the various parts of the application can be determined. The criticality of various applications can drive security requirements as well as redundancy requirements. The granularity of these requirements may be such that not all functions performed have the same integrity level. Accordingly, various applications may have different security requirements and redundancy requirements. The system can partition these applications according to the different requirements. For example, certain data and certain functions of an application may have different data privacy or access restrictions. For example, an application may include data that can be made public as well as data that needs to be kept private. These attributes can determine how secure and insecure resources within the system are partitioned and allocated, and if these attributes are available to a system managers the resources can be allocated and verified automatically.

In another aspect, the system is capable of allocating the resources per the application needs and providing the information back such that the system as built can be documented. The system may include a plurality of subsystems (e.g. devices) and may include a collection of applications running within the system where one or more applications can reside within a subsystem or across multiple subsystems. Each application may have an identified set of requirements which are described in metadata contained within the application and each component of each subsystem may have similar matching metadata that describes its capabilities. For example, the metadata may describe at least the following requirements of the applications and the subsystems: computational, security, reliability, redundancy, throughput, and latency. A system manager may automatically allocate resources to applications either on request or in advance and may also verify the system's ability to provide those resources as built. The system manager can also evaluate based on the final assembly if there are additional resources that can be made available to new applications that have yet to be defined and can also generate an alarm if there is a lack of resources and instruct the end user what resources are required to add to the overall system configuration and where to place these resources. Accordingly, applications and subsystems may be designed and built in isolation, tested to verify that they are functional and meet requirements before assembling them into a complete system, and when they are operating in the presence of other applications they perform just as they did in isolation.

FIG. 1 illustrates an example of a power plant system 100 in accordance with an example embodiment. Referring to FIG. 1, the power plant system (e.g., system 100) includes a gas turbine 110, a power protection system 120, a network server 125, a power distribution system 130, a generator 140, and a control system management device 150 (system manager 150), which are connected to each other over a network 160. For example, the network 160 may be a public network such as the Internet, a private network, or a combination thereof. In this example, the various devices (110, 120, 125, 130, 140, and 150) in the system 100 may be a collection of computers on a network within the power plant and the network server 125 may perform processing of tasks from one or more of the other components at the power plant. Furthermore, within the gas turbine 110 is an environmental application 112, a lubrication application 114, and a fuel system application 116, which are highlighted for convenience of description. These applications may share information and resources (inter-related) on the system 100 but yet each one independently has its own performance needs. For example, the gas turbine 110 may run a particular cycle at a particular rate so that the control system 100 maintains control over the turbine 110 itself. The generator 140 may perform a similar cycle. These two cycles may need to communicate with each other.

In the example of FIG. 1, it should also be appreciated that various other applications may be included in the system which are not shown, for example, quality control applications, motor control applications, control valve applications, speed drive applications, and the like. According to various embodiments, the control system manager 150 may allocate resources to the applications. For example, each application may be allocated a set of resources from the system 100 such as communication resources, computation resources, security resources, reliability resources, timeliness resources, integrity resources, and the like. The control system manager 150 may manage the applications such that they stay within the available resources that are reserved for the particular application. As a result, the interaction between the various devices (110, 120, 125, 130, and 140) is greatly reduced, however, there is still data interfaces between the subsystems which may not be reduced.

In the example of FIG. 1, each of the devices among the gas turbine 110, the power protection system 120, the network server 125, the power distribution 130, and the generator 140, may have metadata associated therewith which provides capabilities of the respective devices. The metadata may be stored on a respective device and be provided to the control system management device 150. For example, the control system management device 150 can discover current resources on the devices within the system 100 that are available based on metadata. The control system manager 150 may reserve the resources for applications. In this way, the control system manager 150 may act as a resource manager. When applications come together in the system 100, the control system management device 150 can make sure every application has the resources it needs. Resources can also be reallocated by the control system management device 150 in response to applications being added and/or removed from the system 100. The control system management device 150 can also determine how much resources are needed by each application on the system 100, and whether the system 100 currently has those resources available through one or more of the devices.

The control system management device 150 may allocate a respective set of resources available in the system 100 from among the plurality of devices 110, 120, 125, 130, 140, and 150) to various applications running within or intending to be run within the system 100. The allocated resources may be a set of or a subset of the resources shown in FIG. 2. According to various embodiments, one or more devices in the system 100 may have data security capabilities that have a higher level of security than other devices. For example, the network server 125 may have the highest level of security capabilities offered, for example, based on encryption capabilities, a hardware protection module included therein, a physical location of the network server (e.g., in a locked room instead of on the plant floor), and the like. Meanwhile, the gas turbine machine 110 may offer a lower level of security capabilities than the network server 125. In this case, if the environmental application 112 requires lower security than the fuel system application 116. Accordingly, the control system management device 150 may allocate security resources of the network server 125 to the fuel system application 116 and allocate security resources of the gas turbine 110 to the environmental application 112. In other words, the fuel system application 116 may be operated on the network server 125 which provides a higher level of security capabilities. As another example, the power protection system 120 may have greater redundancy capabilities (e.g., reliability) than the other devices on the system 100. Accordingly, the control system management device 150 may allocate a power protection application having high reliability requirements to be operated on the power protection system 120 having high reliability capabilities instead of to the network server 125 having lower reliability capabilities.

It should also be appreciated that the power plant system 100 shown in FIG. 1 is merely for purposes of example. The control system according to various embodiments may be included in all different kinds of systems and processes, such as manufacturing, chemical, aircraft, networks, trains, automotive, and the like.

FIG. 3 illustrates an example of metadata including application requirements and subsystem capabilities in accordance with an example embodiment. Referring to FIG. 3, application metadata 310 includes a plurality of resource types 312 and requirements 314 of the resource types 312. In this example, the resource types 312 include security, reliability, integrity, data volume, data processing, and timeliness. Likewise, the device metadata 330 for a subsystem may have device attribute types 332 that mirror resource requirement types 312 of the application metadata 310. For example, the device metadata 330 may include a plurality of attributes 332 having capabilities 334 that correspond to, for example, security, reliability, integrity, data volume, data processing, and timeliness.

The application metadata 310 may have a plurality of requirements for each resource 312. For example, the security resource requirements may identify one or more of encryption requirements, hardware protection requirements, physical location requirements, and the like, required by the corresponding application. Similarly, the device metadata 330 may have security attributes types 332 (e.g., capabilities) of the device that mirror the resources requirement types 312 of an application. The reliability attribute/requirement may include a probability that a system will produce correct outputs up to some given time t. Reliability is enhanced by features that help to avoid, detect and repair hardware faults. As another example, reliability may include a mean time between failures (MTBF), with reliability=exp(−t/MTBF). Reliability is an attribute of any computer-related component (software, or hardware, or a network, for example) that consistently performs according to its specifications. It has long been considered one of three related attributes that must be considered when making, buying, or using a computer product or component. Reliability, availability, and serviceability (RAS) may be important aspects to design into any system. In theory, a reliable product is totally free of technical errors; in practice, however, vendors frequently express a product's reliability quotient as a percentage.

As shown in FIG. 3, the redundancy requirement may be incorporated into the reliability requirements of an application included within the application metadata 310. As another example, the redundancy requirement may have a separate field in the application metadata 310. According to various embodiments, the system and the control system manager 150 may handle redundancy differently than in a related art. In a typical system, for purposes of redundancy, a resource for a given task (such as critical task) is duplicated, triplicated, quadruplicated, and the like, so that redundancy of the resource is achieved. According to the example embodiments, the control system manager 150 may allocate resources to applications in the event of a failure in the system. Rather than duplicate a resource, the system may have built therein enough interchangeable resources to cover for a component in the event of a failure.

In this new approach described by the example embodiments, resources are interchangeable. Therefore, instead of all resources being duplicated or even triplicated, a smaller amount of excess resources may be provided (reallocatable resources by the system manager 150) within the system. For example, enough excess resources may be initially built within the system such that the system has sufficient reserve capacity to reallocate enough resources to handle a failure of any of its sub-systems while still providing enough minimum resources to support the entire system. However, the system does not need to make enough resources available such that every resource is duplicated, triplicated, etc.

In this case, the reallocatable resources can be applied when needed to replace failed resources. In some embodiments, the control system manager 150 may provide a degraded operation mode where previously allocated resources can be taken away or removed (i.e., reallocated) from less critical applications and be used to replace or supplement failed resources that are being used by more critical applications, thus providing degraded operating capabilities to less critical components while still maintaining sufficient operating capabilities to the system overall.

Data integrity is a fundamental component of information security. In its broadest use, data integrity may identify the accuracy and consistency of data stored in a database, data warehouse, data mart or other construct. Data Integrity may include a description of a state, a process or a function (or data quality). The data integrity requirement/capabilities may include data values that are standardized according to a data model and/or data type. The data integrity may include characteristics of the data such as business rules, relations, dates, definitions and lineage. Data integrity may be imposed within a database when it is designed and is authenticated through the ongoing use of error checking and validation routines. As a non-limiting example, to maintain data integrity numeric columns/cells may not accept alphabetic data, and the like.

Data volume may include volume, velocity, variety, and the like, and may be used to identify the amount of data, the variety of types of data, trends in data usage, and the like. Data processing may refer the speed of data processing for the data, throughput, and the like. The timeliness may include latency, jitter, and the like. In the example of FIG. 3, various resources and attributes are identified, but it should be appreciated that the example embodiments are not limited thereto. Furthermore, there may be related systems in which data computation speed is considered as a factor when allocating resources, however, the exemplary embodiments in essence make the system composable by also considering other factors such as security, reliability, integrity, and the like.

Figure 4:
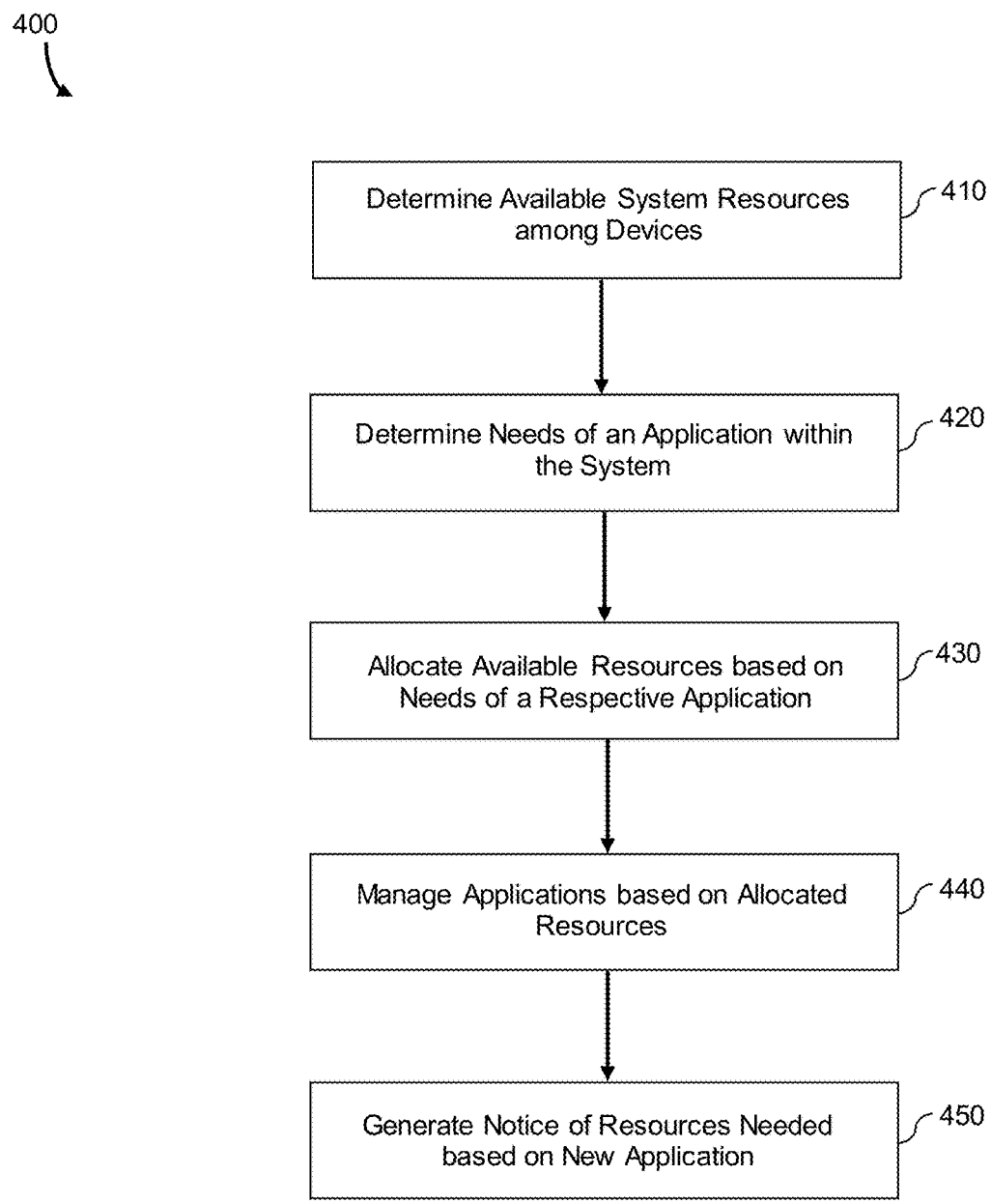
FIG. 4 is a diagram illustrating a method of allocating resources in a system in accordance with an example embodiment.

FIG. 4 illustrates a method 400 of allocating resources in a system in accordance with an example embodiment. For example, the method 400 may be performed by the control system management device 150 shown in FIG. 1. Referring to FIG. 4, the method includes determining resources that are available from a plurality of devices included in a system, in 410. For example, the plurality of devices may have different allocable attributes available to the system. For example, a first device may provide a set amount of security, reliability, integrity, etc., and a second device may provide a different amount of at least one of security, reliability, integrity, and the like. The control system management device may detect the capabilities available from each device (i.e., available resources) and combine or aggregate the resources to generate a total amount of available resources.

In 420, the method includes determining the needs of applications within the system. For example, the control system management device may determine a total amount of resources needed to handle all of the applications in the system, including applications currently included in the system and applications expected to be added to the system. The method further includes allocating available resources from the plurality of devices of the system to a plurality of components (e.g., applications) operating in the system, in 430. For example, the allocating may include reserving a set of resources from the plurality of devices in the system for each respective application, from among the plurality of applications, based on operating requirements included in metadata of a respective application. The allocating may be performed based on the needs of a respective application in addition to the total amount of resources available in the system.

As an example, in 430 the control system management device may reserve a set of resources for each component based on at least one of data processing requirements, integrity requirements, reliability requirements, and timeliness requirements included in the metadata of the respective component. As another example, the control system management device may reserve a security resource from the plurality of devices for each respective component, from among the plurality of components, based on security requirements included in the metadata of the respective component. Here, the reserving may include reserving operating space on one or more devices for executing the component based on security requirements included in the metadata of the component and security features of the one or more devices. The security features of the one or more devices may include at least one of encryption capabilities, hardware protection module capabilities, and physical location of the one or more devices. As another example, the allocating may reserve a reliability resource from the plurality of devices for each respective component, from among the plurality of components, based on reliability requirements included in the metadata of the respective component.

In 440, the method includes managing the plurality of components in the system based on the allocated resources. For example, the control system management device may control the applications operating in the system such that they do not exceed the initially allocated resources thereby reserving the allocated resources to all applications in the system. In addition, in some examples, a new application may be added to the system in 450. In this case, the control system management device may determine if the system has available resources needed by the new application and generate a notice in a situation in which the system does not have enough resources. The notice may be transmitted to a user workstation or user device thereby informing a user of the deficiencies of the system resources and providing a description of the resources that need to be added to satisfy the new application.

Figure 5:
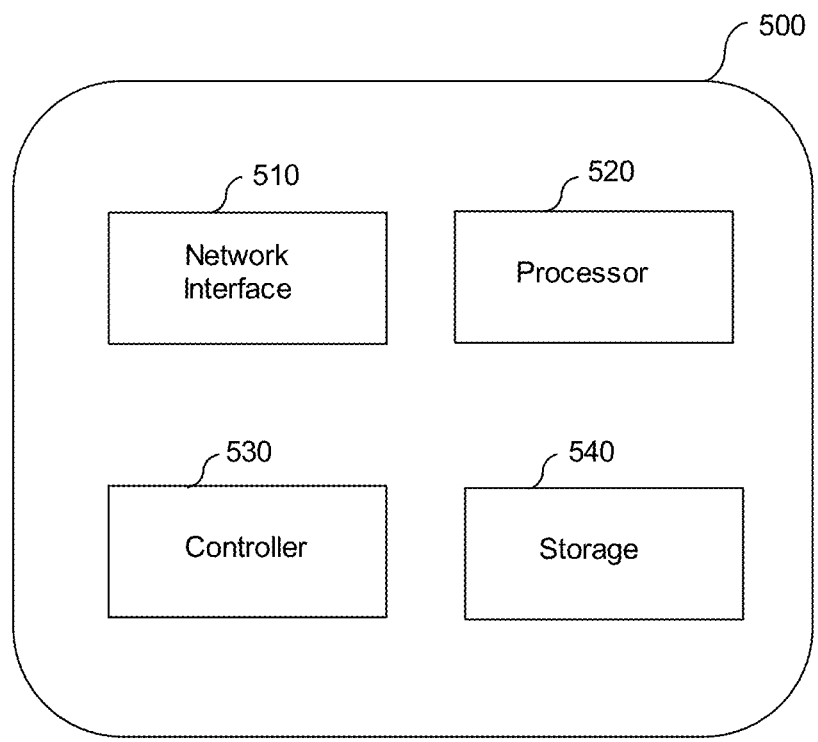
FIG. 5 is a diagram illustrating a control system manager for allocating resources in a system in accordance with an example embodiment.

FIG. 5 illustrates a control system management device 500 for allocating resources in a system in accordance with an example embodiment. For example, the control system management device 500 may be the control system management device 150 in the system of FIG. 1, and it may be capable of performing the method 400 of FIG. 4. Referring to FIG. 5, the control system management device 500 includes a network interface 510, a processor 520, a controller 530, and a storage 540. Although not shown in FIG. 5, the control system management device 500 may include other features, for example, an input unit, a transmitter, a receiver, and the like. The network interface 510 may transmit and receive data over a network such as the Internet or private network to other devices within a system. The processor 520 may include a single core processing device, a multicore processing device, or multiple processing devices. The processor 520 may control the overall operations of the control system management device 500. The storage 530 may store metadata received from devices in the system and detected from applications executing or that are to be executed within the system. The storage 530 may include any desired memory, for example, random access memory (RAM), one or more hard disks, cache, hybrid memory, an external memory, flash memory, and the like.

In this example, the processor 520 may determine resources that are available from a plurality of devices included in the system such as a control system. Each device from among the plurality of devices may have different allocable resources than the other devices. Here, the processor 520 may control the control system management device 500 to detect or otherwise receive the capabilities and/or resources available from the devices based on metadata associated with the devices. The capabilities may be stored within the storage 530. The controller 530 may allocate available resources from the plurality of devices to a plurality of components operating in the system. For example, the controller 530 may reserve a set of resources from the plurality of devices in the system for each respective component, from among the plurality of components, based on operating requirements included in metadata of the respective component. In addition, the processor 520 may manage the plurality of components in the system based on the allocated resources. For example, the processor 520 may prevent a component from exceeding its reserved set of resources from the plurality of devices.

The set of resources for each component may be reserved by the controller 530 based on at least one of data processing requirements, integrity requirements, reliability requirements, and timeliness requirements included in the metadata of the respective component. As another example, the controller 530 may reserve a security resource from the plurality of devices for each respective component, from among the plurality of components, based on security requirements included in the metadata of the respective component. As another example, the controller 530 may reserve a reliability resource from the plurality of devices for each respective component, from among the plurality of components, based on reliability requirements included in the metadata of the respective component.

Composability and resource allocation for data communications within a network is understood. Allocation of computational resources to various applications operating within a common computational platform is somewhat understood. However performance related resources are not the only resources and characteristics important to a modern control system. For example, other resources or characteristics such as security, reliability and integrity are crucial in maintaining system stability. The example embodiments include this information as metadata within an application thus making it possible to determine greater system resource requirements for an application. In addition, a device or parts of a system may also include metadata such that every device and every path within the system is self-describing in terms of these attributes. Accordingly, the present application provides the ability to compose systems that are automatically assembled to meet the application needs, and when they can't meet these needs, for example, due to a lack of resources or incompatibility, the system can add appropriate resources such that the requirements can be met.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the invention as set forth in the appended claims.

What is claimed is:

1. A control system management device comprising:
   a processor configured to determine resources that are available from a plurality of devices included in a system based on device metadata of the plurality of devices, wherein device metadata of each of the plurality of devices is stored on the respective device;
   a controller configured to allocate available resources from the plurality of devices to a plurality of components operating in the system, wherein the controller is configured to reserve a set of resources from the plurality of devices in the system for each respective component, from among the plurality of components, based on operating requirements included in metadata of the respective component and device metadata of the plurality of devices,
   wherein the processor is further configured to manage the plurality of components in the system based on the allocated resources; and
   wherein the plurality of devices includes a plurality of computers on a network within a power plant and the one of the computers among the plurality of computers on the network within the power plant operates as the processor of the control system;
   wherein the plurality of computers includes computers associated with a gas turbine, a power protection system, a power distribution system, and a generator within the power plant.

2. The control system management device of claim 1, wherein the set of resources for each component are reserved by the controller based on data processing requirements, integrity requirements, reliability requirements, and timeliness requirements included in the metadata of the respective component.

3. The control system management device of claim 1, wherein the controller is configured to reserve a security resource from the plurality of devices for each respective component, from among the plurality of components, based on security requirements included in the metadata of the respective component.

4. The control system management device of claim 3, wherein the reserving of the security resource for a respective component comprises reserving one or more devices for executing the component based on security requirements included in the metadata of the component and security features included in metadata of the one or more devices.

5. The control system management device of claim 4, wherein the security features of the one or more devices comprise at least one of encryption capabilities, hardware protection module capabilities, and physical location of the one or more devices.

6. The control system management device of claim 1, wherein the controller is configured to reserve a reliability resource from the plurality of devices for each respective component, from among the plurality of components, based on reliability requirements included in the metadata of the respective component.

7. The control system management device of claim 1, wherein each device from among the plurality of devices has different allocable resources than the other devices.

8. The computer-implemented method of claim 1, wherein the processor is configured to manage the system by preventing a component from exceeding its reserved set of resources from the plurality of devices.

9. The control system management device of claim 1, wherein the processor is configured to detect a failure of a resource allocated to a first component, and the controller is configured to dynamically remove resources previously allocated to a second component and allocate them to the first component, based on a redundancy requirement included in metadata of the first component.

10. The control system management device of claim 6, wherein the reliability requirement includes a probability that the system will produce correct outputs up to a target time.

11. A computer-implemented method for allocating system resources, the computer-implemented method comprising:
    determining resources that are available from a plurality of devices included in a system based on device metadata of the plurality of devices, wherein device metadata of each of the plurality of devices is stored on the respective device;
    allocating available resources from the plurality of devices to a plurality of components operating in the system, the allocating comprising reserving a set of resources from the plurality of devices in the system for each respective component, from among the plurality of components, based on operating requirements included in metadata of the respective component and device metadata of the plurality of devices;
    managing the plurality of components in the system based on the allocated resources;
    wherein the plurality of devices includes a plurality of computers on a network within a power plant and the one of the computers among the plurality of computers on the network within the power plant operates as a processor; and
    wherein the plurality of computers includes computers associated with a gas turbine, a power protection system, a power distribution system, and a generator within the power plant.

12. The computer-implemented method of claim 11, wherein the set of resources for each component are reserved based on data processing requirements, integrity requirements, reliability requirements, and timeliness requirements included in the metadata of the respective component.

13. The computer-implemented method of claim 11, wherein the allocating comprises reserving a security resource from the plurality of devices for each respective component, from among the plurality of components, based on security requirements included in the metadata of the respective component.

14. The computer-implemented method of claim 13, wherein the reserving of the security resource for a respective component comprises reserving one or more devices for executing the component based on security requirements included in the metadata of the component and security features of the one or more devices.

15. The computer-implemented method of claim 14, wherein the security features of the one or more devices comprise at least one of encryption capabilities, hardware protection module capabilities, and physical location of the one or more devices.

16. The computer-implemented method of claim 11, wherein the allocating comprises reserving a reliability resource from the plurality of devices for each respective component, from among the plurality of components, based on reliability requirements included in the metadata of the respective component.

17. The computer-implemented method of claim 11, wherein each device from among the plurality of devices has different allocable resources than the other devices.

18. The computer-implemented method of claim 11, wherein the managing comprises preventing a component from exceeding its reserved set of resources from the plurality of devices.

19. The computer-implemented method of claim 11, wherein the method further comprises detecting a failure of a resource allocated to a first component, and dynamically removing resources previously allocated to a second component and allocating them to the first component, based on a redundancy requirement included in metadata of the first component.

20. A non-transitory computer-readable medium having stored therein instructions that when executed cause a computer to perform a method for allocating control system resources, the method comprising:
    determining resources that are available from a plurality of devices included in a control system based on device metadata of the plurality of devices, wherein device metadata of each of the plurality of devices is stored on the respective device;
    allocating available resources from the plurality of devices to a plurality of components operating in the control system, the allocating comprising reserving a set of resources from the plurality of devices in the system for each respective component, from among the plurality of components, based on operating requirements included in metadata of the respective component and device metadata of the plurality of devices;
    managing the plurality of components in the system based on the allocated resources;
    wherein the plurality of devices includes a plurality of computers on a network within a power plant and the one of the computers among the plurality of computers on the network within the power plant operates as a processor of the control system; and wherein the plurality of computers includes computers associated with a gas turbine, a power protection system, a power distribution system, and a generator within the power plant.

21. The non-transitory computer-readable medium of claim 20, wherein the allocating comprises reserving a security resource from the plurality of devices for each respective component, from among the plurality of components, based on security requirements included in the metadata of the respective component.

* * * * *